J. Camack,
Double-Acting Pump.
N° 49,716.        Patented Sep. 5, 1865.
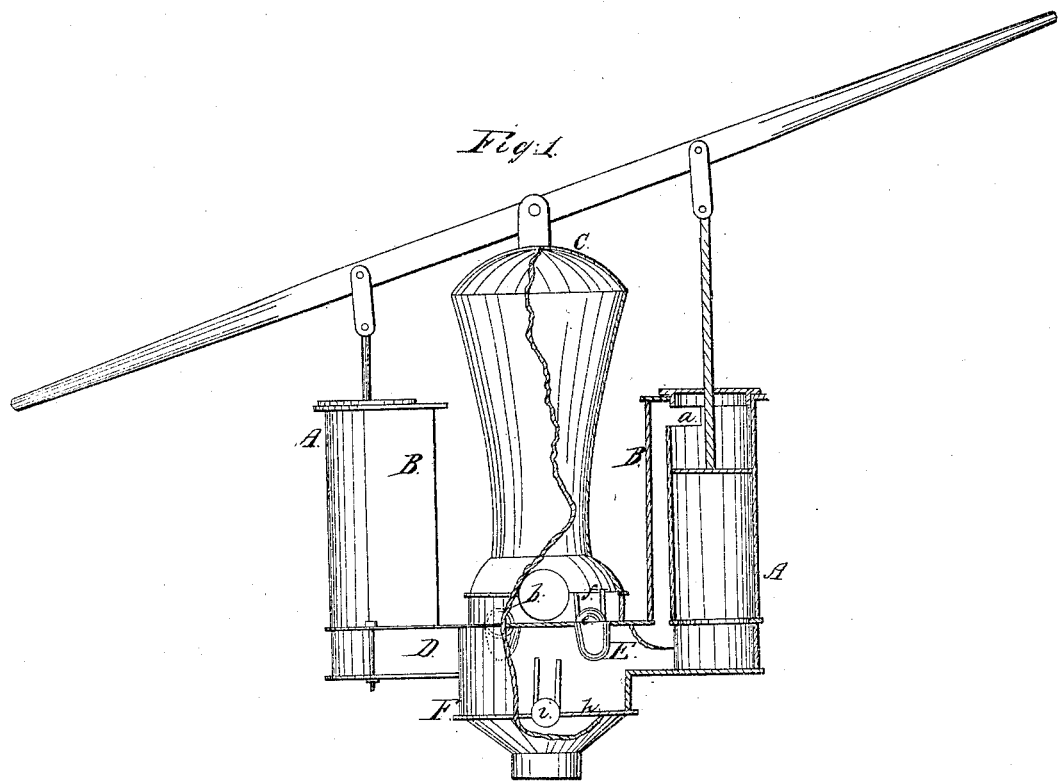
Fig. 1.
Fig. 2.
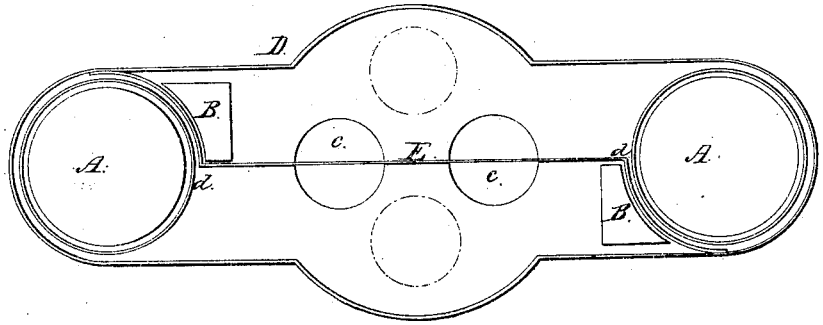
Witnesses;
E. N. Drury
J. A. Willoughby
Inventor,
James Camack
By his Atty,
W. C. Dodge

UNITED STATES PATENT OFFICE.

JAMES CAMACK, OF DANE, WISCONSIN.

IMPROVEMENT IN PUMPS.

Specification forming part of Letters Patent No. 49,716, dated September 5, 1865.

*To all whom it may concern:*

Be it known that I, JAMES CAMACK, of Dane, in the county of Dane and State of Wisconsin, have invented certain new and useful Improvements in Pumps; and I do hereby declare that the following is a full, clear, and exact description of the same, reference being had to the accompanying drawings, and to the letters of reference marked thereon, making part of this specification.

Figure 1 represents a side elevation of my improved pump, a portion being broken away for the purpose of showing the arrangement of the internal parts. Fig. 2 is a bottom-plan view of the lower or body portion of the same.

The nature of my invention consists in a novel arrangement of the valves in connection with the other portions of the pump, whereby it is rendered more efficient.

To enable others to construct and use my invention, I will proceed to describe it.

A represents the cylinders, of which there are two. To the side of each cylinder A is attached an additional water-chamber, B, of the form shown in Fig. 2 in cross-section, connecting with the cylinder near the top by the opening $a$ and opening into the chamber D at the bottom.

Between the cylinders A A, and resting upon the chamber D, is the dome or air-chamber C, provided with the outlet or exit pipe $b$, as shown in Fig. 1. These parts and their operation, being common and well understood, need not be more fully described.

The chamber D, which constitutes the trunk or body of the pump, is divided by the partition E into two separate compartments, said partition being placed vertically therein and extending from end of said chamber. Near each end of the chamber the partition is curved, as shown at $d$ of Fig. 2, by which means the cylinder A at one end and the chamber B at the opposite end are both made to open into the same compartment, the opposite and corresponding parts being arranged in a similar manner.

In the plate forming the upper wall of the chamber D two openings, $cc$, are made, one leading from the compartment on one side of partition E up the into the air-chamber C above, and the other being on the opposite side of partition E, and serving to connect the opposite compartment with the air-chamber C, in a similar manner. Each of these openings $c$ are provided with a ball-valve, $e$, held in place by three or more small vertical rods, $f$, or by any equivalent means.

The central portion, F, of the chamber D is enlarged and made circular in form, as shown in Fig. 2, and this circular portion is made of nearly double the vertical depth of the remainder of the chamber, as shown in Fig. 1. A diaphragm, $h$, extends across the bottom of this circular portion of the chamber, and this diaphragm $h$ is also provided with two openings, one leading into each of the compartments on either side of partition E, their position being shown in red in Fig. 2. Ball-valves $i$, similar to those already described, serve to close these openings, as shown in Fig. 1.

It will be observed that the openings and valves leading from the compartments of chamber D into the air-chamber C are so located as to be near the walls of the air-chamber and entirely out of the way of the outlet-pipe $b$, thus forming no obstacle to the ready passage of the water to and out of said outlet $b$.

It will also be observed that the valves and openings in the diaphragm $h$ are placed on a line at right angle to those above, so that the water, in rushing up through the lower openings, will impinge upon the solid portion of the floor of C, directly above, instead of striking against the valves above, as would be the case if the upper valves were placed directly over those below, as has hitherto been the case in this class of pumps.

As these pumps have heretofore been constructed, flap-valves have been used, and were located in a line across the floor of C at right angles to the length thereof, and being hinged directly under and in front of the outlet-pipe $b$, it followed that whenever the valves were opened the one nearest the outlet was thrown up directly in front of and but a short distance from said outlet, whereby the flow of the water was greatly obstructed and the pump rendered much less efficient than when arranged as in my improved plan. The water, rushing from the lower openings directly up against the under side of the upper valves, also tended to force them open, and thus prevented the pump from working satisfactorily. By my construction and arrangement of parts these difficulties are entirely obviated.

By the use of ball-valves in the place of the old-fashioned flap-valves several advantages are obtained. First, the ball-valves are more durable and less likely to leak, the wear upon them only serving to fit them more accurately to their seats, and thus render them still more tight and perfect in their operation. Another advantage is, that when the ball-valve is raised from its seat it rests, as it were, upon the inflowing column of water, which is thereby deflected sidewise, and thus prevented from rushing against the upper valves and tending to unseat them.

I am aware of the patent granted to D. Farnham, October 3, 1837, and my present invention is intended as an improvement upon that and similarly-constructed pumps, that pump being deficient in the respects above set forth. By the substitution of the ball-valves for the flap-valves therein used, and more especially in the location and arrangement of the valves, consist my improvements. By these improvements I am enabled to render a pump hitherto comparatively useless a most efficient and useful implement.

Having thus fully described my improvements, what I claim is—

The combination of the water-chamber D with the cylinders A, chambers B, air-chamber C, and the valves $e$ and $i$, all arranged and operating as herein set forth.

JAMES CAMACK.

Witnesses:
H. C. DODGE,
J. D. WILLOUGHBY.